(12) United States Patent
Pyrhönen et al.

(10) Patent No.: US 10,998,785 B2
(45) Date of Patent: May 4, 2021

(54) ROTOR OF AN INDUCTION MACHINE

(71) Applicant: LAPPEENRANNAN-LAHDEN TEKNILLINEN YLIOPISTO LUT, Lappeenranta (FI)

(72) Inventors: Juha Pyrhönen, Lappeenranta (FI); Jussi Sopanen, Lappeenranta (FI)

(73) Assignee: LAPPEENRANNAN-LAHDEN TEKNILLINEN YLIOPISTO LUT, Lappeenranta (FI)

( * ) Notice: Subject to any disclaimer, the term of this patent is extended or adjusted under 35 U.S.C. 154(b) by 106 days.

(21) Appl. No.: 16/486,593

(22) PCT Filed: Feb. 13, 2018

(86) PCT No.: PCT/FI2018/050096
§ 371 (c)(1),
(2) Date: Aug. 16, 2019

(87) PCT Pub. No.: WO2018/154176
PCT Pub. Date: Aug. 30, 2018

(65) Prior Publication Data
US 2019/0372414 A1 Dec. 5, 2019

(30) Foreign Application Priority Data
Feb. 24, 2017 (FI) .................................... 20175174

(51) Int. Cl.
*H02K 1/32* (2006.01)
*H02K 17/16* (2006.01)

(52) U.S. Cl.
CPC ............. *H02K 1/32* (2013.01); *H02K 17/165* (2013.01)

(58) Field of Classification Search
CPC ........ H02K 1/32; H02K 17/16; H02K 17/165; H02K 17/18; H02K 17/185; H02K 9/00–9/28
(Continued)

(56) References Cited

U.S. PATENT DOCUMENTS

| 4,311,932 A | 1/1982 | Olson |
| 5,866,959 A | 2/1999 | Le Flem |

(Continued)

FOREIGN PATENT DOCUMENTS

| CN | 201656607 U | 11/2010 |
| CN | 104659942 A | 5/2015 |

(Continued)

OTHER PUBLICATIONS

International Search Report, dated Apr. 9, 2018, from corresponding PCT application No. PCT/FI2018/050096.
(Continued)

*Primary Examiner* — Thomas Truong
(74) *Attorney, Agent, or Firm* — Nixon & Vanderhye

(57) ABSTRACT

A rotor of an induction machine includes a ferromagnetic core structure and a cage winding. The cage winding includes rotor bars and end-rings. The rotor bars are located in slots of the ferromagnetic core structure. The end-rings connect the ends of the rotor bars to each other at the ends of the ferromagnetic core structure. The radial height of the slots of the ferromagnetic core structure is greater than the radial height of the rotor bars so that the bottom portions of the slots are free from the rotor bars. Therefore, the bottom portions of the slots constitute cooling ducts for conducting cooling fluid through the rotor. As the rotor bars constitute one wall of each cooling duct, the cooling fluid has a direct contact with the rotor bars.

9 Claims, 5 Drawing Sheets

(58) Field of Classification Search
USPC .............................................. 310/60 A, 212
See application file for complete search history.

(56) References Cited

U.S. PATENT DOCUMENTS

| | | |
|---|---|---|
| 2014/0175916 A1 | 6/2014 | Chamberlin et al. |
| 2015/0280525 A1* | 10/2015 | Rippel .................... H02K 9/24 |
| | | 310/54 |
| 2016/0233744 A1 | 8/2016 | Kaneshige et al. |

FOREIGN PATENT DOCUMENTS

| | | |
|---|---|---|
| CN | 106340981 A | 1/2017 |
| EP | 0012318 A1 | 6/1980 |
| EP | 0649211 A2 | 4/1995 |
| JP | S5627887 U | 3/1981 |
| JP | S57196849 A | 12/1982 |
| JP | S6024159 U | 2/1985 |
| JP | S61170253 A | 7/1986 |
| JP | S61-165055 U | 10/1986 |
| JP | 2006-067777 A | 3/2006 |

OTHER PUBLICATIONS

FI Search Report, dated Sep. 6, 2017, from corresponding FI application No. 20175174.
Written Opinion, dated Jan. 29, 2019, from corresponding PCT application No. PCT/FI2018/050096.
Search Report for Finnish Patent Application No. 20175174 dated Sep. 11, 2019.
Office Action issued in Chinese Patent Application No. 201880010552.7 dated Jan. 15, 2021 with English translation provided.

* cited by examiner

ROTOR OF AN INDUCTION MACHINE

FIELD OF THE TECHNOLOGY

The disclosure relates generally to rotating electric machines. More particularly, the disclosure relates to a rotor of an induction machine. Furthermore, the disclosure relates to an induction machine.

BACKGROUND

Rotating electric machines, such as motors and generators, generally comprise a rotor and a stator which are arranged such that a magnetic flux is developed between these two. A rotor of an induction machine comprises typically a ferromagnetic core structure, a shaft, and a cage winding. A cage winding comprises rotor bars and end-rings. The rotor bars are located in slots of the ferromagnetic core structure. The end-rings connect the ends of the rotor bars to each other at the ends of the ferromagnetic core structure. The rotor bars can be parallel with the axial direction of the rotor or, alternatively, the rotor bars can be skewed with respect to the axial direction of the rotor. The ferromagnetic core structure is typically composed of ferromagnetic steel sheets which are electrically insulated from each other and which are stacked in the axial direction of the rotor.

In many induction machines, a significant portion of heat generated in the rotor bars is removed so that the rotor bars conduct heat in the longitudinal direction of the rotor bars to the end-rings which, in turn, transfer heat to ambient air or some other gas. The rotor bars transfer heat also to the ferromagnetic core structure but, in typical cases where the ferromagnetic core structure is a stack of electrically insulated ferromagnetic sheets, the ability of the ferromagnetic core structure to transfer heat in the axial direction is limited and thus a main heat transfer path from the rotor bars through the ferromagnetic core structure is via the air-gap surface of the rotor and via the shaft of the rotor. Cooling of the rotor bars can be made more effective by increasing areas of the rotor bars which have a direct contact with air or some other cooling fluid. One approach to increase the areas which have the direct contact with air or other cooling fluid is to use hollow rotor bars so that air or other cooling fluid is arranged to flow through the hollow rotor bars. In cases where hollow rotor bars are used, there can be however a trade-off between cooling properties and electric properties of a cage winding because the hollowness of the rotor bars limits a freedom to design the cross-sectional profiles of the rotor bars.

SUMMARY

The following presents a simplified summary in order to provide a basic understanding of some embodiments of the invention. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In this document, the word "geometric" when used as a prefix means a geometric concept that is not necessarily a part of any physical object. The geometric concept can be for example a geometric point, a straight or curved geometric line, a geometric plane, a non-planar geometric surface, a geometric space, or any other geometric entity that is zero, one, two, or three dimensional.

In accordance with the invention, there is provided a new rotor for an induction machine. A rotor according to the invention comprises a ferromagnetic core structure and a cage winding which comprises:

rotor bars located in slots of the ferromagnetic core structure, and end-rings connecting first ends of the rotor bars to each other at a first end of the ferromagnetic core structure and connecting second ends of the rotor bars to each other at a second end of the ferromagnetic core structure.

The radial height, i.e. the depth, of the slots of the ferromagnetic core structure is greater than the radial height of the rotor bars so that the bottom portions of the slots of the ferromagnetic core structure which are closest to the geometric rotation axis of the rotor are free from the rotor bars. Therefore, the bottom portions of the slots of the ferromagnetic core structure can be used as cooling ducts for conducting air or some other cooling fluid.

As each rotor bar constitutes one wall of the corresponding cooling duct, air or other cooling fluid which flows in the cooling ducts has a direct contact with the rotor bars. Thus, there is no need for hollow rotor bars in order to arrange a direct contact between the rotor bars and cooling fluid which flows axially through the rotor.

The shaft of the rotor comprises an axial bore and the ferromagnetic core structure and the shaft comprise bores connecting the axial bore to the bottom portions of the slots. Thus, the rotor is capable of acting as a centrifugal blower which sucks cooling fluid via the axial bore and blows the cooling fluid out from the bottom portions of the slots.

In accordance with the invention, there is provided also a new induction machine. An induction machine according to the invention comprises:

a stator comprising stator windings for generating a rotating magnetic field in response to being supplied with alternating currents, and a rotor according to the invention, the rotor being rotatably supported with respect to the stator.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in conjunction with the accompanying drawings.

The verbs "to comprise" and "to include" are used in this document as open limitations that neither exclude nor require the existence of also un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below in the sense of examples and with reference to the accompanying drawings, in which.

DESCRIPTION OF EXEMPLIFYING AND NON-LIMITING EMBODIMENTS

The specific examples provided in the description given below should not be construed as limiting the scope and/or the applicability of the appended claims. Furthermore, it is to be understood that lists and groups of examples provided in the description given below are not exhaustive unless otherwise explicitly stated.

Figure 1A:
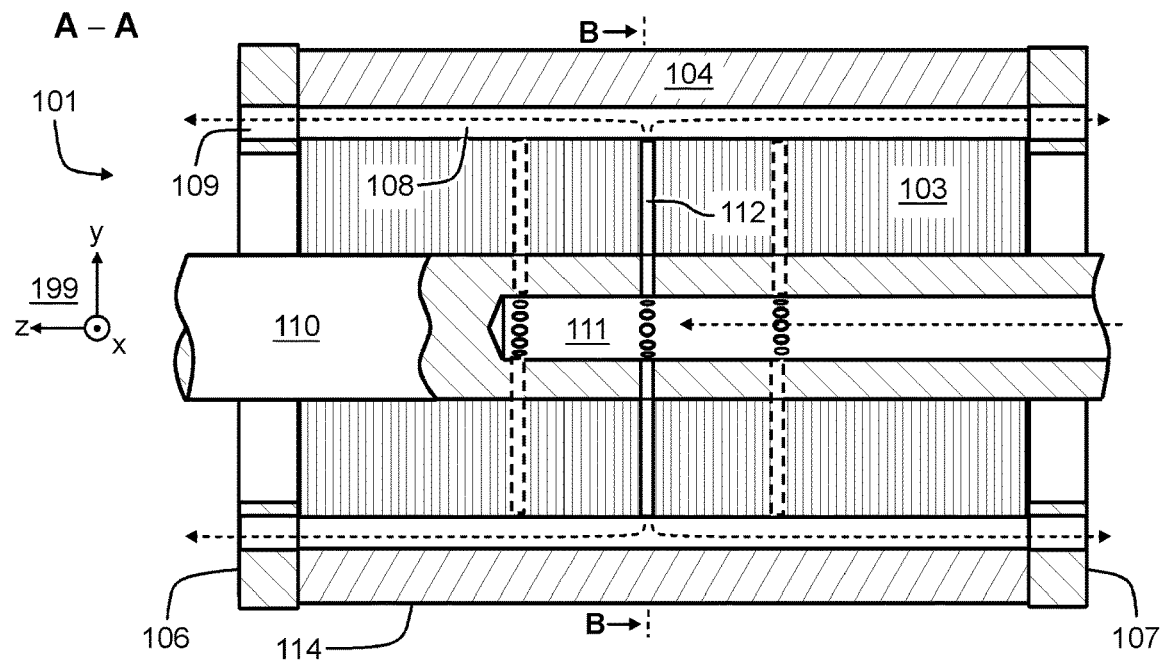
FIGS. 1a, 1b, and 1c illustrate a rotor according to an exemplifying and non-limiting embodiment of the invention.
Figure 1B:
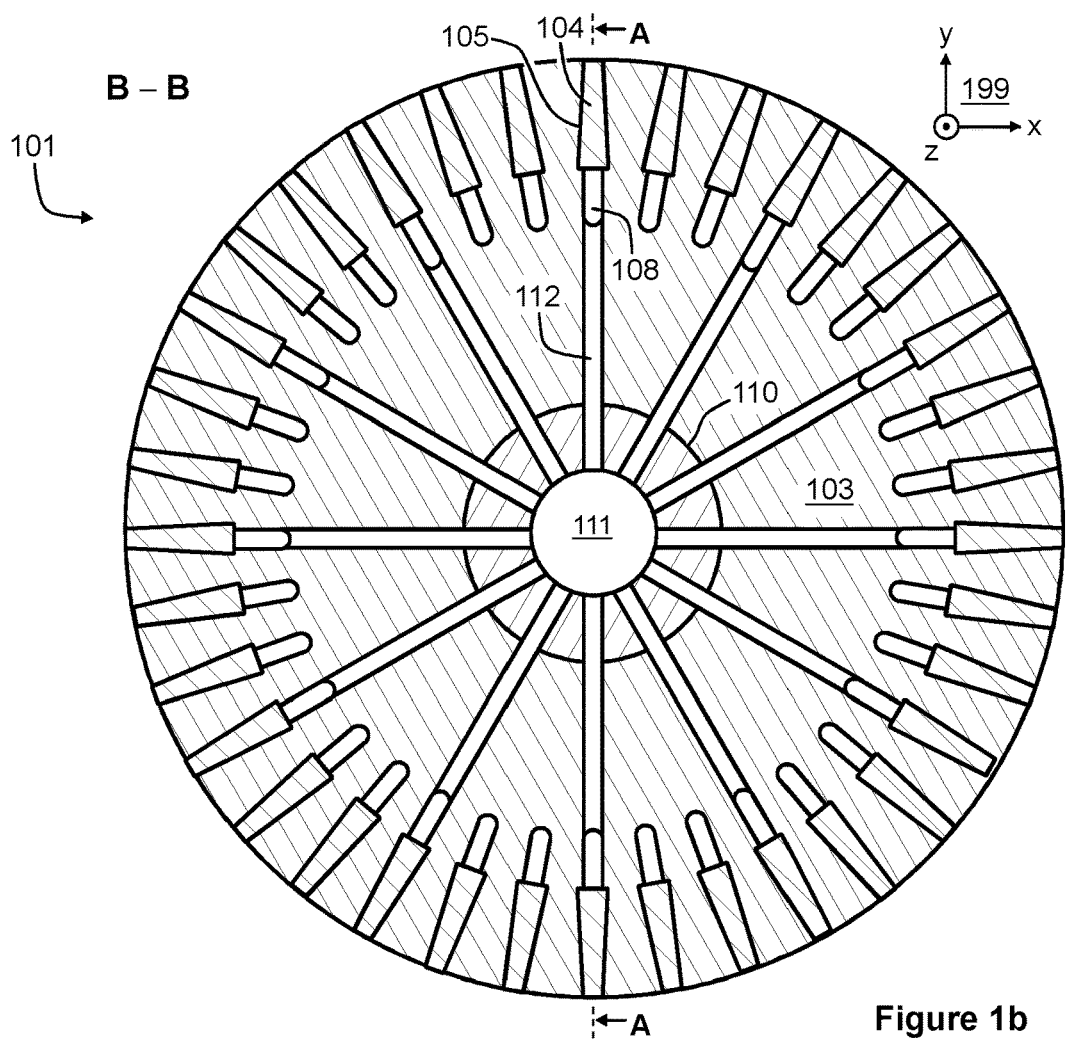
Figure 1C:
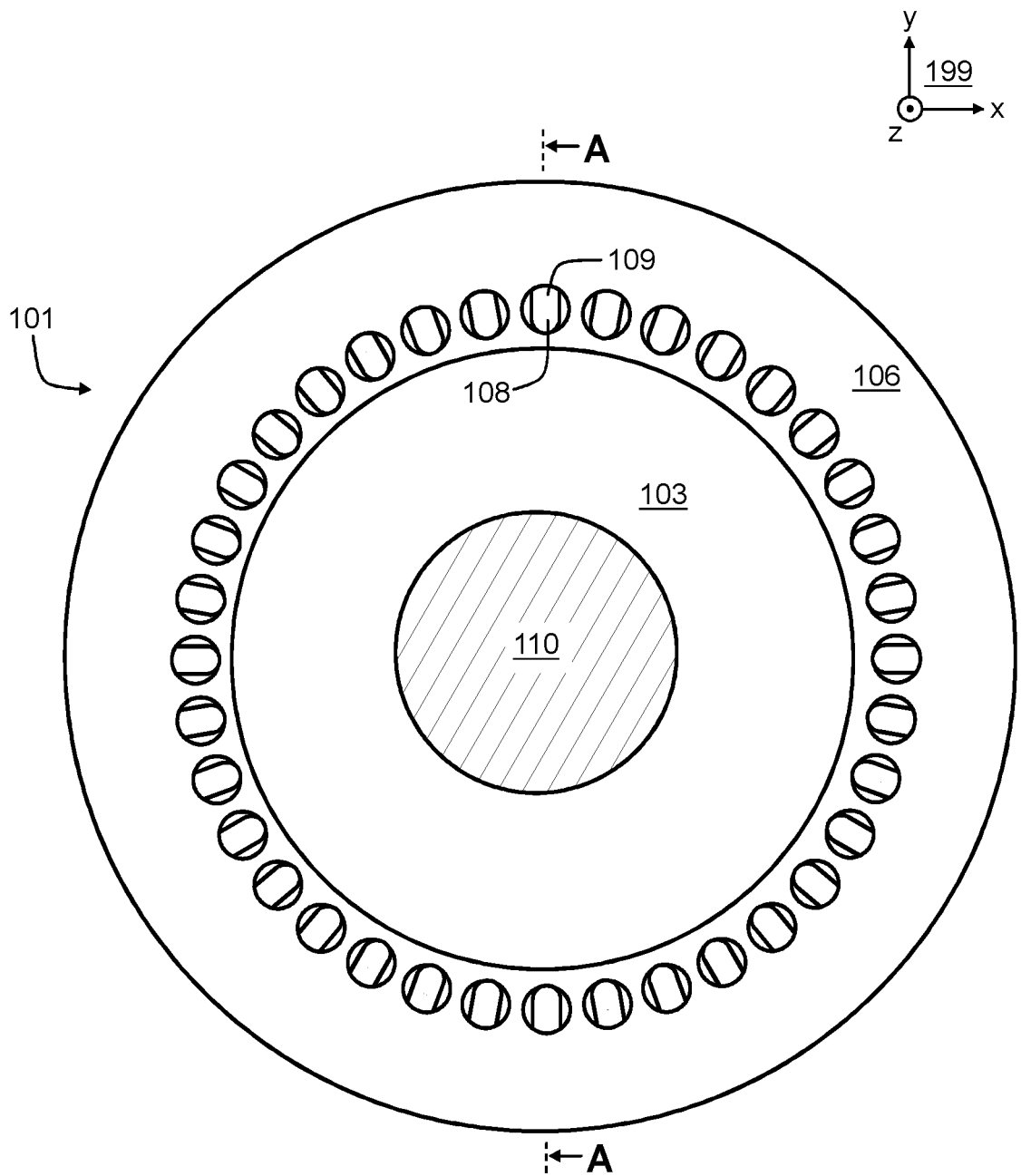

FIGS. 1a and 1b show section views of a rotor 101 according to an exemplifying and non-limiting embodiment of the invention. The section shown in FIG. 1a is taken along a line A-A shown in FIG. 1b and the section plane is parallel with the yz-plane of a coordinate system 199. The section shown in FIG. 1b is taken along a line B-B shown in FIG. 1a and the section plane is parallel with the xy-plane of the coordinate system 199. FIG. 1c shows the rotor 101 when seen along the negative z-direction of the coordinate system 199. The rotor 101 comprises a ferromagnetic core structure 103 that can be composed of ferromagnetic steel sheets which are electrically insulated from each other and stacked in the axial direction of the rotor 101. In FIGS. 1a-1c, the axial direction is parallel with the z-axis of the coordinate system 199. For another example, the ferromagnetic core structure can be made of solid steel and furthermore the ferromagnetic core structure and a shaft 110 of the rotor can constitute a single piece of solid steel. It is also possible that the ferromagnetic core structure 103 is made of or comprises ferrite or iron powder composites such as SOMALOY® (Soft Magnetic Composite). In cases where the rotor is a rotor of a high speed induction machine, the ferromagnetic core structure is advantageously made of solid steel and constitutes, together with the shaft, a single piece of solid steel. The rotor 101 comprises a cage winding 114 that comprises rotor bars located in slots of the ferromagnetic core structure 103. In FIGS. 1a and 1b, one of the rotor bars is denoted with a reference 104. In FIG. 1b, one of the slots of the ferromagnetic core structure 103 is denoted with a reference 105. The cage winding 114 further comprises end-rings 106 and 107 arranged to connect first ends of the rotor bars to each other at a first end of the ferromagnetic core structure 103 and second ends of the rotor bars to each other at a second end of the ferromagnetic core structure 103. In the exemplifying rotor illustrated in FIGS. 1a-1c, the rotor bars are parallel with the axial direction of the rotor, i.e. the rotor bars are non-skewed.

As illustrated in FIGS. 1a and 1b, the radial height, i.e. the depth, of the slots of the ferromagnetic core structure 103 is greater than the radial height of the rotor bars. The rotor bars are positioned in the slots so that the bottom portions of the slots are free from the rotor bars. Therefore, the bottom portions of the slots can be used as cooling ducts for conducting air or some other cooling fluid. In FIGS. 1a and 1b, the bottom portion of the slot 105 is denoted with a reference 108.

In the exemplifying rotor illustrated in FIGS. 1a-1c, the end-rings 106 and 107 comprise apertures so that each aperture is axially on a same line with one of the bottom portions of the slots. In FIGS. 1a and 1c, one of the apertures of the end-ring 106 is denoted with a reference 109.

In the exemplifying rotor illustrated in FIGS. 1a-1c, the shaft 110 of the rotor comprises an axial bore 111. The ferromagnetic core structure 103 and the shaft 110 comprise radially extending bores connecting the axial bore 111 to the bottom portions of the slots. Thus, the rotor is capable of acting as a centrifugal blower which sucks cooling fluid via the axial bore 111 and blows the cooling fluid out from the bottom portions of the slots. In FIG. 1a, flows of the cooling fluid are depicted with dashed line arrows. The radially extending bores can be radially directed i.e. perpendicular to the axial direction, or the radially extending bores can be slanting with respect to the axial direction. In FIGS. 1a and 1b, one of the radially extending bores is denoted with a reference 112. The radially extending bores can be arranged to constitute groups of bores located at different places in the axial direction in order to avoid a situation in which the radially extending bores weaken the mechanical strength of the rotor 101 too much. In the exemplifying rotor illustrated in FIGS. 1a-1c, the radially extending bores constitute three groups so that the radially extending bores belonging to a first one of the groups are located on a first geometric plane parallel with the xy-plane of the coordinate system 199, the radially extending bores belonging to a second one of the groups are located on a second geometric plane parallel with the xy-plane of the coordinate system 199 and a distance apart from the first geometric plane, and the radially extending bores belonging to a third one of the groups are located on a third geometric plane parallel with the xy-plane of the coordinate system 199 and distances apart from the first and second geometric planes. In FIG. 1a, some of the radially extending bores which do not coincide with the sections shown in FIGS. 1a and 1b are depicted with dashed lines.

Figure 2A:
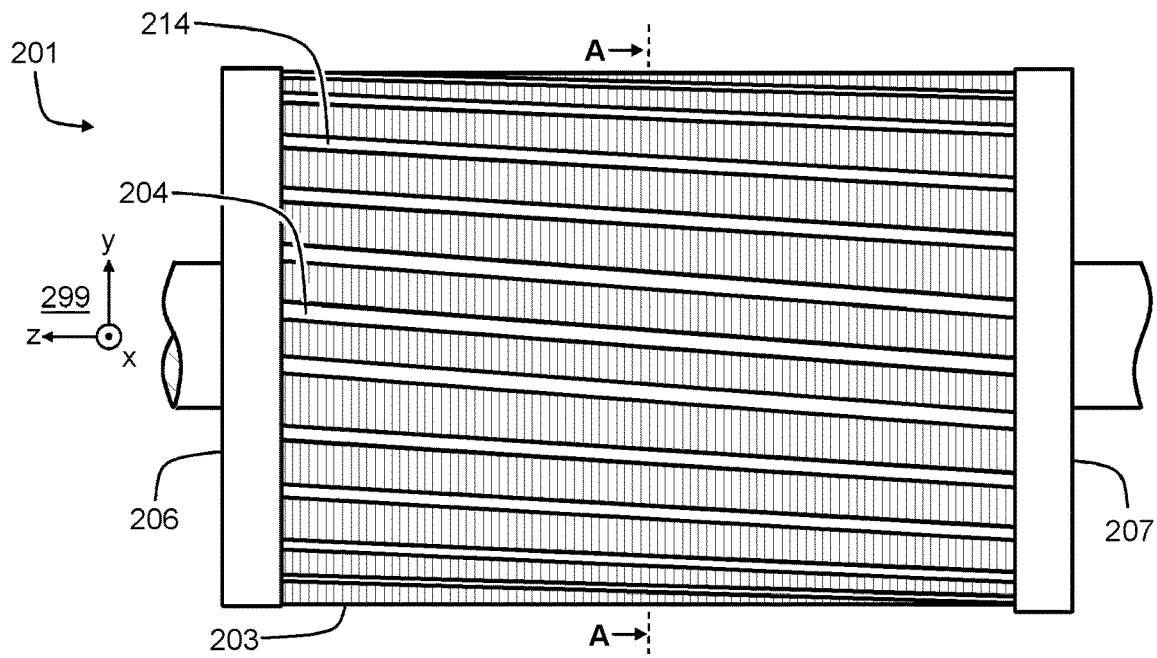
FIGS. 2a, 2b, and 2c illustrate a rotor according to another exemplifying and non-limiting embodiment of the invention.
Figure 2B:
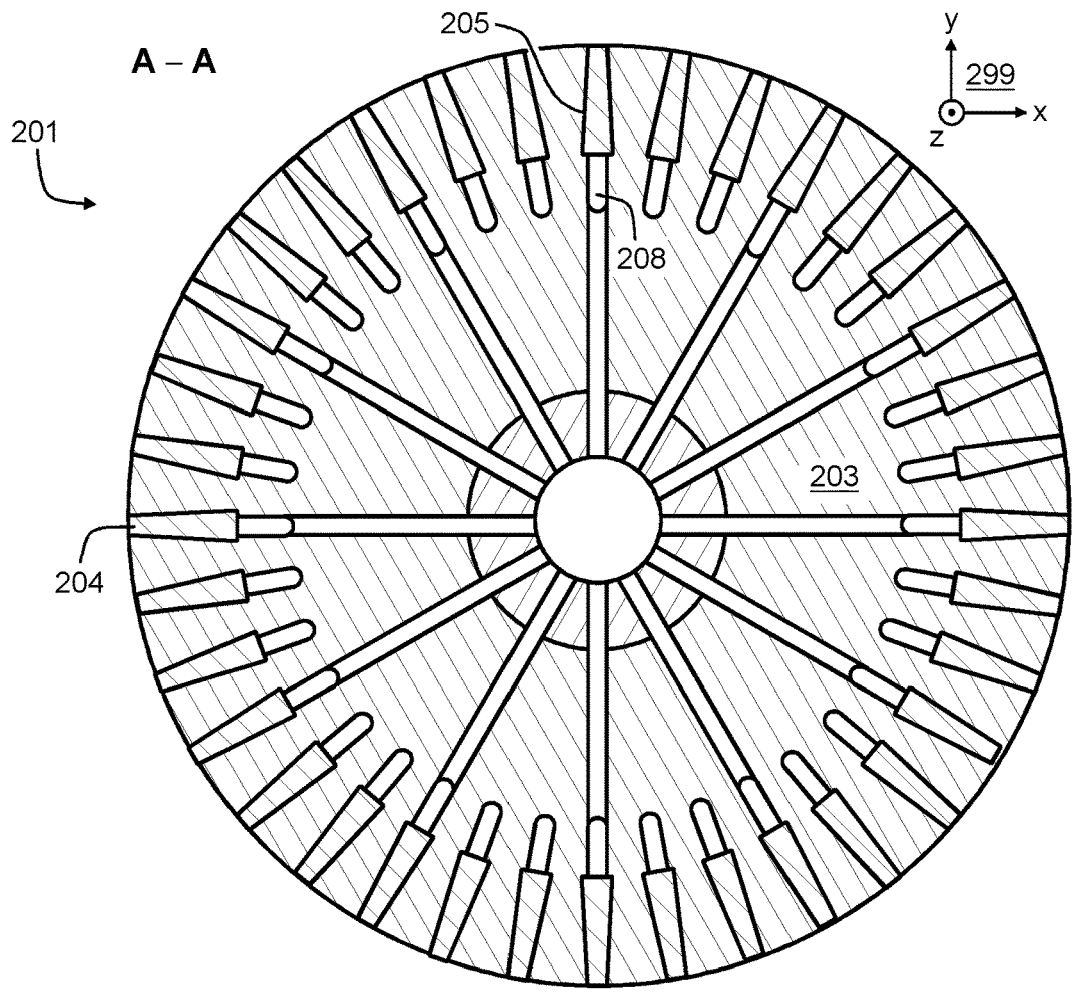
Figure 2C:
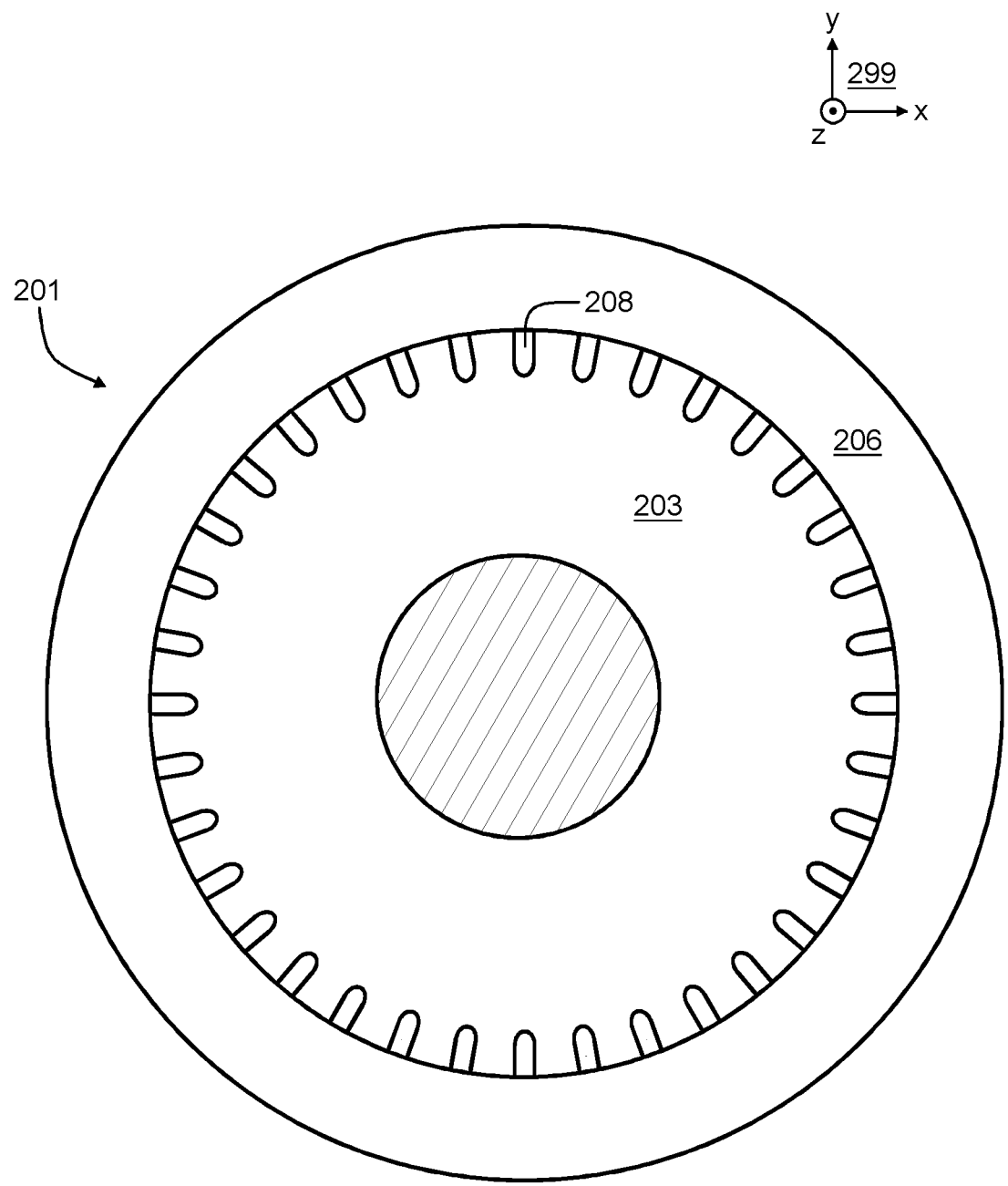

FIG. 2a shows a side view of a rotor 201 according to an exemplifying and non-limiting embodiment of the invention. FIG. 2b shows section view of the rotor. The section is taken along a line A-A shown in FIG. 2a and the section plane is parallel with the xy-plane of a coordinate system 299. FIG. 2c shows the rotor 201 when seen along a negative z-direction of the coordinate system 299. The rotor 201 comprises a ferromagnetic core structure 203 that can be composed of ferromagnetic steel sheets which are electrically insulated from each other and stacked in the axial direction of the rotor. In FIGS. 2a-2c, the axial direction is parallel with the z-axis of the coordinate system 299. The rotor 201 comprises a cage winding 214 that comprises rotor bars located in slots of the ferromagnetic core structure 203. In FIGS. 2a and 2b, one of the rotor bars is denoted with a reference 204. In FIG. 2b, one of the slots of the ferromagnetic core structure 203 is denoted with a reference 205. The cage winding 214 further comprises end-rings 206 and 207 arranged to connect first ends of the rotor bars to each other at a first end of the ferromagnetic core structure 203 and second ends of the rotor bars to each other at a second end of the ferromagnetic core structure 203. In the exemplifying rotor illustrated in FIGS. 2a-2c, the rotor bars are skewed with respect to the axial direction of the rotor 201.

As illustrated in FIG. 2b, the radial height, i.e. the depth, of the slots of the ferromagnetic core structure 203 is greater than the radial height of the rotor bars. The rotor bars are positioned in the slots so that the bottom portions of the slots are free from the rotor bars. Therefore, the bottom portions of the slots can be used as cooling ducts for conducting air or some other cooling fluid. In FIG. 2b, the bottom portion of the slot 205 is denoted with a reference 208. As illustrated in FIG. 2c, the end-rings 206 and 207 are dimensioned and positioned so that the end-rings do not cover the bottom portions of the slots of the of the ferromagnetic core structure 203.

Figure 3:
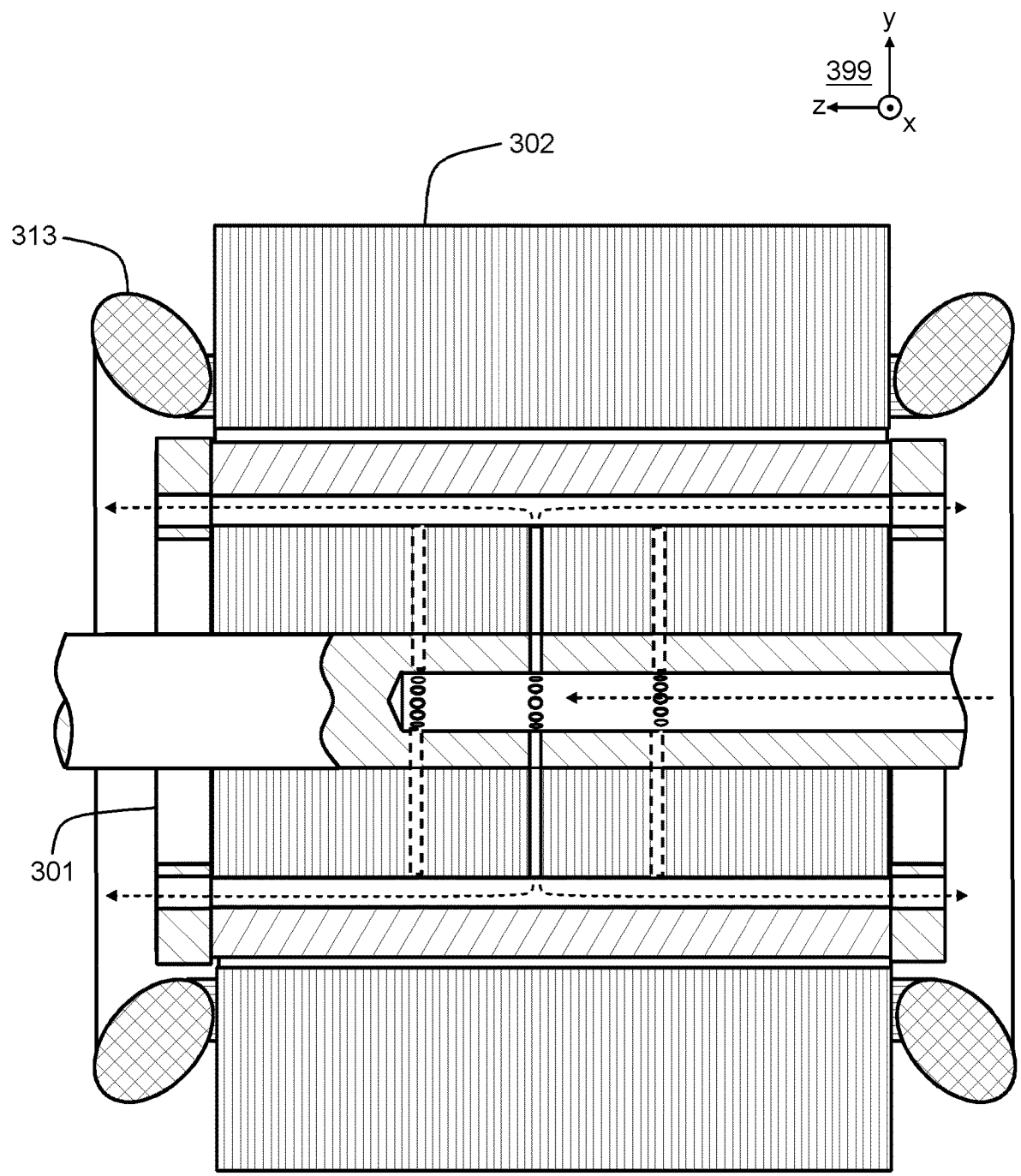
FIG. 3 illustrates an induction machine according to an exemplifying and non-limiting embodiment of the invention.

FIG. 3 illustrates an induction machine according to an exemplifying and non-limiting embodiment of the invention. The induction machine comprises a rotor 301 according to an embodiment of the invention and a stator 302. The rotor 301 is rotatably supported with respect to the stator 302. Arrangements for rotatably supporting the rotor 301 with respect to the stator 302 are not shown in FIG. 3. The stator 302 comprises stator windings 313 for generating a rotating magnetic field in response to being supplied with alternating currents. The stator windings 313 can be for example a three-phase winding. The rotor 301 can be for example such as illustrated in FIGS. 1a-1c or such as illustrated in FIGS. 2a-2c.

The specific examples provided in the description given above should not be construed as limiting the scope and/or the applicability of the appended claims. Lists and groups of examples provided in the description given above are not exhaustive unless otherwise explicitly stated.

What is claimed is:

1. A rotor for an induction machine, the rotor comprising a ferromagnetic core structure and a cage winding comprising:
   rotor bars located in slots of the ferromagnetic core structure, and
   end-rings connecting first ends of the rotor bars to each other at a first end of the ferromagnetic core structure and connecting second ends of the rotor bars to each other at a second end of the ferromagnetic core structure,
wherein a radial height of the slots of the ferromagnetic core structure is greater than a radial height of the rotor bars, and bottom portions of the slots of the ferromagnetic core structure which are closest to a geometric rotation axis of the rotor are free from the rotor bars so that the bottom portions of the slots of the ferromagnetic core structure constitute cooling ducts for conducting cooling fluid, and a shaft of the rotor comprises an axial bore, and the ferromagnetic core structure and the shaft comprise bores connecting the axial bore to the bottom portions of the slots, the rotor being suitable for acting as a centrifugal blower sucking the cooling fluid via the axial bore and blowing the cooling fluid out from the bottom portions of the slots.

2. A rotor according to claim 1, wherein each of the end-rings comprises apertures so that each aperture is axially on a same line with one of the bottom portions of the slots.

3. A rotor according to claim 2, wherein the ferromagnetic core structure comprises ferromagnetic sheets electrically insulated from each other and stacked in an axial direction of the rotor.

4. A rotor according to claim 1, wherein the ferromagnetic core structure comprises ferromagnetic sheets electrically insulated from each other and stacked in an axial direction of the rotor.

5. A rotor according to claim 4, wherein the bores connecting the axial bore to the bottom portions of the slots constitute groups of bores located at different places in an axial direction of the rotor.

6. A rotor according to claim 1, wherein the bores connecting the axial bore to the bottom portions of the slots constitute groups of bores located at different places in an axial direction of the rotor.

7. A rotor according to claim 1, wherein the rotor bars are parallel with an axial direction of the rotor.

8. A rotor according to claim 1, wherein the rotor bars are skewed with respect to an axial direction of the rotor.

9. An induction machine comprising:
   a stator comprising stator windings for generating a rotating magnetic field in response to being supplied with alternating currents, and
   a rotor rotatably supported with respect to the stator,
   wherein the rotor comprises a ferromagnetic core structure and a cage winding comprising:
      rotor bars located in slots of the ferromagnetic core structure, and
      end-rings connecting first ends of the rotor bars to each other at a first end of the ferromagnetic core structure and connecting second ends of the rotor bars to each other at a second end of the ferromagnetic core structure,
wherein a radial height of the slots of the ferromagnetic core structure is greater than a radial height of the rotor bars, and bottom portions of the slots of the ferromagnetic core structure which are closest to a geometric rotation axis of the rotor are free from the rotor bars so that the bottom portions of the slots of the ferromagnetic core structure constitute cooling ducts for conducting cooling fluid, and a shaft of the rotor comprises an axial bore, and the ferromagnetic core structure and the shaft comprise bores connecting the axial bore to the bottom portions of the slots, the rotor being suitable for acting as a centrifugal blower sucking the cooling fluid via the axial bore and blowing the cooling fluid out from the bottom portions of the slots.

* * * * *